United States Patent
Takeuchi et al.

(10) Patent No.: US 12,005,535 B2
(45) Date of Patent: Jun. 11, 2024

(54) METHOD FOR PRODUCING SHRINK-FITTED MEMBER

(71) Applicant: NGK Insulators, Ltd., Nagoya (JP)

(72) Inventors: Fumitaka Takeuchi, Kasugai (JP); Shuhei Kuno, Komaki (JP); Seiya Sawada, Komaki (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/168,007

(22) Filed: Feb. 13, 2023

(65) Prior Publication Data

US 2023/0321770 A1    Oct. 12, 2023

(30) Foreign Application Priority Data

Mar. 25, 2022    (JP) ................................. 2022-050610

(51) Int. Cl.
*B23P 11/02*  (2006.01)
*B21D 22/20*  (2006.01)
*B21D 53/06*  (2006.01)

(52) U.S. Cl.
CPC ............ *B23P 11/025* (2013.01); *B21D 22/20* (2013.01); *B21D 53/06* (2013.01)

(58) Field of Classification Search
CPC ........ B21D 22/20; B21D 53/06; B23P 11/025
See application file for complete search history.

(56) References Cited

U.S. PATENT DOCUMENTS

| 10,151,230 | B2 * | 12/2018 | Bookbinder | .......... F01N 3/2875 |
| 10,465,585 | B2 * | 11/2019 | Bookbinder | .......... F01N 3/0211 |
| 2018/0353892 | A1 * | 12/2018 | Bookbinder | ..... B01D 46/24494 |
| 2022/0390180 | A1 * | 12/2022 | Kuno | ..................... F28D 7/106 |

FOREIGN PATENT DOCUMENTS

| JP | 2001526115 | A | * | 12/1998 |
| JP | 2002207023 | A | * | 7/2002 |
| JP | 2007021706 | A | * | 2/2007 |
| JP | 2007170672 | A | * | 7/2007 |
| JP | 2013228189 | A | * | 11/2013 |
| JP | 2014070826 | A | * | 4/2014 |
| JP | 2015199189 | A | * | 11/2015 |

(Continued)

OTHER PUBLICATIONS

AZO Materials, "Stainless Steel—Grade 430 (UNS S43000)", 2001, Website: <https://www.azom.com/article.aspx?ArticleID=996> Ret. 28 Sep. 2023 (Year: 2001).*

(Continued)

*Primary Examiner* — Jacob J Cigna
(74) *Attorney, Agent, or Firm* — BURR PATENT LAW, PLLC

(57) ABSTRACT

A method for producing a shrink-fitted member by arranging a pillar shaped ceramic body inside a deep-drawn stainless steel pipe and shrink-fitting them. The method includes: a preparing step of preparing the deep-drawn stainless steel pipe produced by deep-drawing and the pillar shaped ceramic body; a heating step of heating the deep-drawn stainless steel pipe to 900° C. or more; and a shrink-fitting step of inserting the pillar shaped ceramic body into the heated deep-drawn stainless steel pipe and shrink-fitting them.

19 Claims, 4 Drawing Sheets

(56) References Cited

FOREIGN PATENT DOCUMENTS

| JP | 6219705 B2 | * | 10/2017 | | |
|----|------------|---|---------|---|---|
| JP | 2018076226 A | * | 5/2018 | | |
| JP | 6405279 B2 | * | 10/2018 | | |
| JP | 6510283 B2 | * | 5/2019 | | |
| JP | 6510283 B2 | | 5/2019 | | |
| JP | 6523415 B2 | * | 5/2019 | | |
| WO | WO-2012067156 A1 | * | 5/2012 | ......... | B01D 46/2429 |

OTHER PUBLICATIONS

English Translation of JP-6405279-B2 (Year: 2015).*
English Translation of JP-2015199189-A (Year: 2015).*

* cited by examiner

METHOD FOR PRODUCING SHRINK-FITTED MEMBER

CROSS REFERENCE TO RELATED APPLICATIONS

The present invention claims the benefit of priority to Japanese Patent Application No 2022-050610 filed on Mar. 25, 2022 with the Japanese Patent Office, the entire contents of which are incorporated herein by reference in its entirety.

FIELD OF THE INVENTION

The present invention relates to a method for producing a shrink-fitted member.

BACKGROUND OF THE INVENTION

Heat exchangers often requires properties such as corrosion resistance. Therefore, ceramic heat exchangers are used. In the chemical and pharmaceutical industries, the heat exchangers are used for heating, cooling and condensing various fluids including acids (bromic acid, sulfuric acid, hydrofluoric acid, nitric acid, hydrochloric acid, etc.), alkalis (caustic alkalis, etc.), halides, saline solutions, organic compounds, and the like. Also, the heat exchangers are used for systems that worm up a coolant, an engine oil and an automatic transmission fluid (ATF: Automatic Transmission Fluid) at an early stage at the time of engine startup to reduce friction losses, or systems that heat an exhaust gas purifying catalyst in order to activate the catalyst at an early stage.

The ceramic heat exchangers include those each having a structure in which a pillar shaped ceramic body is housed in a metal pipe. The heat exchangers having such a structure have an advantage that even if the ceramic body is damaged therein, the fluids are not mixed together.

Known as a method for housing the pillar shaped ceramic body in the metal pipe is a shrink-fitting method in which the metal pipe is heated, and the ceramic body is inserted into a predetermined position in the metal pipe, and then cooled (for example, Patent Literature 1).

PRIOR ART

Patent Literature

[Patent Literature 1] Japanese Patent No. 6510283 B

SUMMARY OF THE INVENTION

The present invention is specified as follows:
The present invention relates to a method for producing a shrink-fitted member by arranging a pillar shaped ceramic body inside a deep-drawn stainless steel pipe and shrink-fitting them, the method comprising:
- a preparing step of preparing the deep-drawn stainless steel pipe produced by deep-drawing and the pillar shaped ceramic body;
- a heating step of heating the deep-drawn stainless steel pipe to 900° C. or more; and
- a shrink-fitting step of inserting the pillar shaped ceramic body into the heated deep-drawn stainless steel pipe and shrink-fitting them.

DETAILED DESCRIPTION OF THE INVENTION

Figure 1:
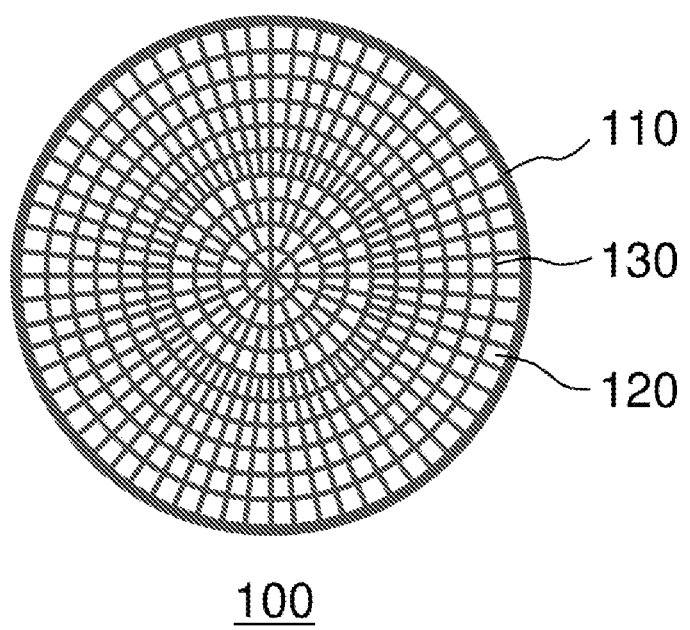
FIG. 1 is a cross-sectional view perpendicular of a honeycomb structure, which is to an axial direction.

In recent years, the use of seamless pipes as metal pipes employed for shrink-fitting has been studied. Since the seamless pipes are stronger than welded pipes with seams, they would be effective for improving the durability of the heat exchangers.

However, if shrink-fitting is performed using a deep-drawn stainless steel pipe produced by deep-drawing as the seamless pipe, the pillar shaped ceramic body tends to be broken during the shrink-fitting. This would be because the deep-drawn stainless steel pipe produced by the deep-drawing becomes hardened by work hardening, and a surface pressure on the pillar shaped ceramic body is increased during the shrink-fitting.

The present invention has been made to solve the problems as described above. An object of the present invention is to provide a method for producing a shrink-fitted member that can suppress breakage of a pillar shaped ceramic body even if a deep-drawn stainless steel pipe produced by deep-drawing is used.

According to the present invention, it is possible to provide a method for producing a shrink-fitted member that can suppress breakage of a pillar shaped ceramic body even if a deep-drawn stainless steel pipe produced by deep-drawing is used.

Hereinafter, embodiments of the present invention will be specifically described with reference to the drawings as needed. It is to understand that the present invention is not limited to the following embodiments, and those which appropriately added changes, improvements and the like to the following embodiments based on knowledge of a person skilled in the art without departing from the spirit of the present invention fall within the scope of the present invention.

The method for producing a shrink-fitted member according to an embodiment of the present invention is carried out by arranging a pillar shaped ceramic body inside a deep-drawn stainless steel pipe and shrink-fitting them.

First, the deep-drawn stainless steel pipe and the pillar shaped ceramic body used in the method for producing the shrink-fitted member according to the embodiment of the present invention will be described.

<Deep-Drawn Stainless Steel Pipe>

The deep-drawn stainless steel pipe is a stainless steel pipe made by deep-drawing.

Also, it is preferable that the deep-drawn stainless steel pipe is not subjected to any heat treatment after the deep-drawing. That is, the deep-drawn stainless steel pipe is intended to be one that has not undergone any heat treatment after the deep-drawing and before a heating step as described later. The deep-drawn stainless steel pipe that is not subjected to the heat treatment after the deep-drawing becomes hardened by work hardening due to the deep-drawing.

A shape of the deep-drawn stainless steel pipe is not particularly limited as long as it is a shape that can allow the pillar shaped ceramic body to be inserted into the deep-drawn stainless steel pipe, and it may be various shapes such as a cylindrical shape and a rectangular cylindrical shape. Further, the deep-drawn stainless steel pipe may be a straight pipe having a uniform diameter in the axial direction, or may be a pipe other than the straight pipe. The pipe other than the straight pipe is a pipe configured such that the diameter varies in the axial direction, including decreased and/or increased diameter pipes each partially having a tapered portion.

The deep-drawn stainless steel pipe preferably has a thermal expansion coefficient of 10 to $22 \times 10^{-6}/°$ C. at 0 to 1100° C. The deep-drawn stainless steel pipe having such a thermal expansion coefficient can allow the pillar shaped ceramic body to be easily inserted into the interior during a heating step as described later.

The type of stainless steel making up the deep-drawn stainless steel pipe is not particularly limited, and ferritic and austenitic stainless steel, and the like can be used. Examples of the ferritic stainless steel include SUS430 and SUS436L, and examples of the austenitic stainless steel include SUS304.

The deep-drawn stainless steel pipe can be produced by deep-drawing a stainless steel plate. Conditions for the deep-drawing are not particularly limited, and they may be appropriately adjusted depending on types of stainless steel plates to be used. Moreover, a commercially available stainless steel pipe may be used as the deep-drawn stainless steel pipe.

<Pillar Shaped Ceramic Body>

The pillar shaped ceramics body is made of ceramics and formed into a pillar shape, and has a fluid flow path extending from a first end face to a second end face. The pillar shape is not limited to a cylindrical shape, and it may be a shape in which a cross section perpendicular to an axial direction (an extending direction of the flow path) is an elliptical shape, or an oval shape formed by combining arcs, a quadrangular shape, or other polygonal shape. Also, the pillar shaped ceramic body may be a hollow type ceramic body having a hollow portion at a central portion in the cross section perpendicular to the axial direction.

The pillar shaped ceramic body preferably has a thermal conductivity of 50 W/(m·K) or more at 25° C., and more preferably from 100 to 300 W/(m·K), and even more preferably from 120 to 300 W/(m K). The thermal conductivity of the pillar shaped ceramic body in such a range can lead to an improved thermal conductivity and can allow the heat inside the pillar shaped ceramic body to be efficiently transmitted to the outside. It should be noted that the value of thermal conductivity is a value measured according to the laser flash method (JIS R 1611:1997).

The pillar shaped ceramic body is based on ceramics. The phrase "based on ceramics" means that a ratio of a mass of ceramics to the total mass is 50% by mass or more.

The pillar shaped ceramic body is preferably based on SiC (silicon carbide) having high thermal conductivity. The phrase "based on SiC (silicon carbide)" means that a ratio of a mass of SiC (silicon carbide) to the total mass is 50% by mass or more.

More particularly, the material of the pillar shaped ceramic body that can be used herein includes Si—SiC materials such as Si-impregnated SiC and (Si+Al) impregnated SiC, metal composite SiC, recrystallized SiC, $Si_3N_4$, SiC, and the like. Among them, the Si—SiC material is preferably used, because it can be produced at a lower cost, and has high thermal conductivity.

The pillar shaped ceramic body is preferably a honeycomb structure.

Figure 2:
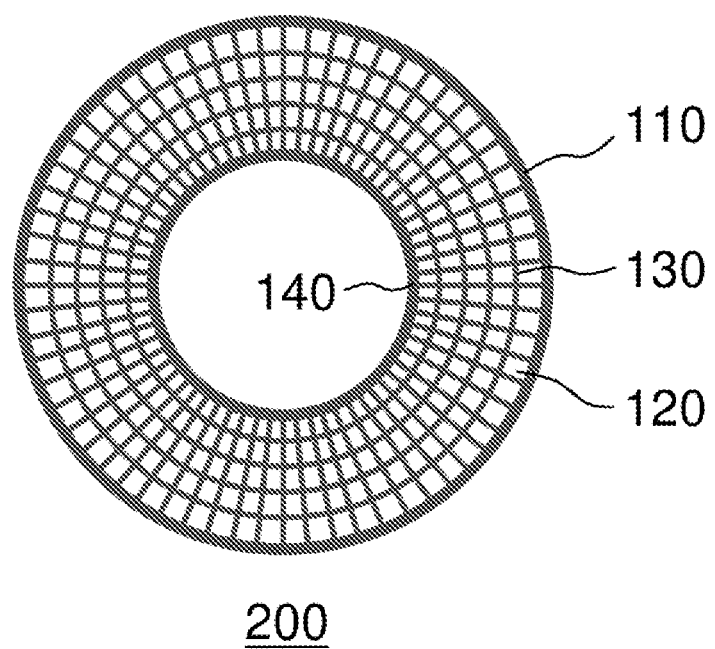
FIG. 2 is a cross-sectional view of a honeycomb structure, which is perpendicular to an axial direction.

Here, each of FIGS. 1 and 2 shows a cross-sectional view of a typical honeycomb structure, which is perpendicular to the axial direction.

A honeycomb structure 100 as shown in FIG. 1 includes: an outer peripheral wall 110; and a partition wall 130 arranged on an inner side of the outer peripheral wall 110 and defining a plurality of cells 120 each extending from a first end face to a second end face. Moreover, a honeycomb structure 200 as shown in FIG. 2 includes: an outer peripheral wall 110; an inner peripheral wall 140; and a partition wall 130 arranged between the outer peripheral wall 110 and the inner peripheral wall 140, and defining a plurality of cells 120 each extending from a first end face to a second end face. The honeycomb structure 200 is called a hollow type honeycomb structure. By having the partition wall 130, each of those honeycomb structures 100, 200 can efficiently collect heat from a fluid flowing through the cells 120 and transfer it to the outside.

The shape of each cell 120 in the cross section perpendicular to the axial direction of each of the honeycomb structures 100, 200 is not limited to the illustrated shape, and it may be circular, elliptical, or polygonal such as triangular, or the like.

A cell density (that is, the number of cells 120 per unit area) in the cross section of the honeycomb structure 100, 200 perpendicular to the axial direction is not particularly limited. The cell density may be adjusted as needed depending on the applications and the like, and it may preferably be in a range of from 4 to 320 cells/cm². The cell density of 4 cells/cm² or more can sufficiently ensure the strength of the partition wall 130, hence the strength of the honeycomb structure 100, 200 itself and effective GSA (geometrical surface area). Further, the cell density of 320 cells/cm² or less can allow an increase in a pressure loss to be prevented when the fluid flows.

The thickness of the partition wall 130 of the honeycomb structure 100, 200 may be appropriately designed depending on the purpose, and is not particularly limited. The thickness of the partition wall 130 is preferably 50 μm to 2 mm, and more preferably 60 μm to 600 μm. The thickness of the partition wall 130 of 50 μm or more can result in improved mechanical strength to prevent damages due to impact or thermal stress. On the other hand, the thickness of the partition wall 130 of 2 mm or less reduces a pressure loss of the fluid due to an increased proportion of the cell volume in the honeycomb structure 100, 200, so that the heat exchange efficiency can be improved.

The thicknesses of the outer peripheral wall 110 and the inner peripheral wall 140 of the honeycomb structure 100, 200 may also be appropriately designed depending on to the purposes, and are not particularly limited. When the shrink-fitted member is used for general heat exchange applications, the thickness of each of the outer peripheral wall 110 and the inner peripheral wall 140 is preferably more than 0.3 mm and 10 mm or less, and more preferably from 0.5 mm to 5 mm, and even more preferably from 1 mm to 3 mm. Moreover, when the shrink-fitted member is used for a thermal storage application, the thickness of the outer peripheral wall 110 is preferably 10 mm or more, in order to increase a heat capacity of the outer peripheral wall 110.

Each of the outer peripheral wall 110, the partition wall 130 and the inner peripheral wall 140 preferably has a porosity of 10% or less, and more preferably 5% or less, and even more preferably 3% or less. Further, the porosity of the outer peripheral wall 110, the partition wall 130 and the inner peripheral wall 140 may be 0%. The porosity of the outer peripheral wall 110, the partition wall 130 and the inner peripheral wall 140 of 10% or less can lead to improvement of thermal conductivity.

The honeycomb structure 100, 200 preferably has an isostatic strength of more than 100 MPa, and more preferably 150 MPa or more, and more preferably 200 MPa or more. The isostatic strength of the honeycomb structure 100, 200 of more than 100 MPa can lead to the honeycomb structure 100, 200 having improved durability. The isostatic strength of the honeycomb structure 100, 200 can be measured according to the method for measuring isostatic breakdown strength as defied in the JASO standard M 505-87 which is a motor vehicle standard issued by Society of Automotive Engineers of Japan, Inc.

The pillar shaped ceramic body can be produced by a method known in the art. The method for producing the honeycomb structure 100, 200 will be described as an example of the specific methods for producing the pillar shaped ceramic body.

First, a green body containing ceramic powder is extruded into a desired shape to prepare a honeycomb formed body. At this time, the shape and density of the cells 120, the number, length and thickness of the partition wall 130, the shapes and the thicknesses of the outer peripheral wall 110 and the inner peripheral wall 140 and the like, can be controlled by selecting dies and jig in appropriate forms. The material of the honeycomb formed body that can be used herein includes the ceramics as described above. For example, when producing a honeycomb formed body based on a Si-impregnated SiC composite, a binder and water or an organic solvent can be added to a predetermined amount of SiC powder, and the resulting mixture can be kneaded to form a green body, which can be formed into a honeycomb formed body having a desired shape. The resulting honeycomb formed body can be then dried, and the honeycomb formed body can be impregnated with metal Si and fired under reduced pressure in an inert gas or vacuum to obtain the honeycomb structure 100, 200.

Figure 3:
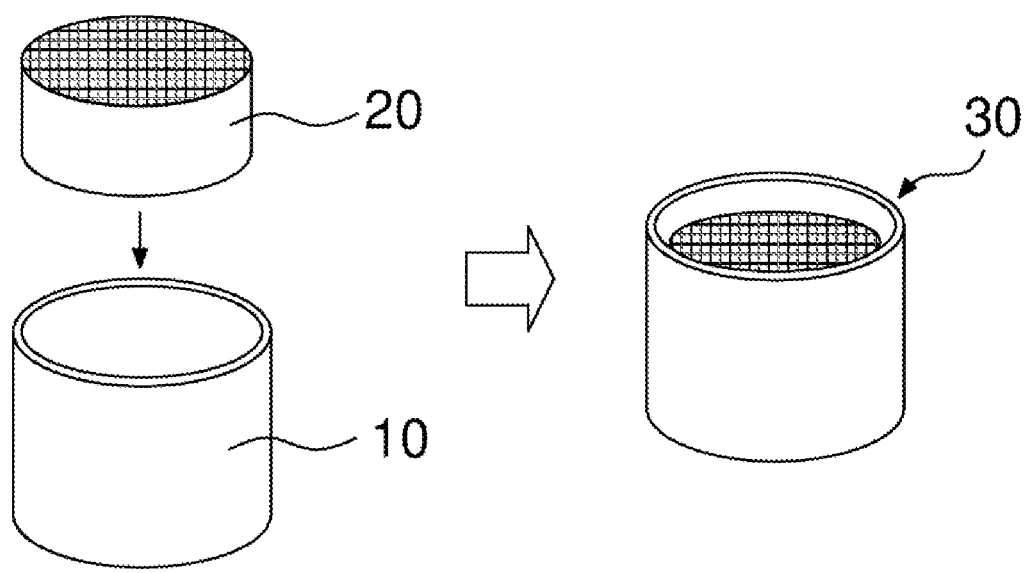
FIG. 3 is a view for explaining a method for producing a shrink-fitted member according to an embodiment of the present invention.

The method for producing the shrink-fitted member according to an embodiment of the present invention is carried out using the deep-drawn stainless steel pipe and the pillar shaped ceramic body as described above. FIG. 3 shows a view (perspective view) for explaining the production method.

The method for producing the shrink-fitted member according to the embodiment of the present invention includes: a preparing step; a heating step, and a shrink-fitting step. Also, the production method may further include a cooling step after the shrink-fitting step. The production method having these steps can be carried out using a known producing apparatus (for example, the producing apparatus described in Japanese Patent No. 6510283 B).

<Preparing Step>

The preparing step is a step of preparing a deep-drawn stainless steel pipe 10 produced by deep-drawing and a pillar shaped ceramic body 20. The deep-drawn stainless steel pipe 10 may be produced by deep-drawing as described above, or may employ a commercially available product. Also, the pillar shaped ceramic body 20 can be produced by the known method as described above.

If necessary, an intermediate material may be wound around an outer peripheral surface parallel to the axial direction of the pillar shaped ceramic body 20. At this time, an adhesive may be used to attach the intermediate material to the outer peripheral surface parallel to the axial direction of the pillar shaped ceramic body 20. The use of the adhesive can achieve uniform attachment of the intermediate material. Preferably, the adhesive is sufficiently thin and has good thermal conductivity.

Examples of the intermediate material includes graphite sheets, metal sheets, gel sheets, and elastoplastic fluids. Examples of the metals forming the metal sheets include gold (Au), silver (Ag), copper (Cu), aluminum (Al), and the like. The elastoplastic fluid is a material that behaves as a solid (has a modulus of elasticity) without undergoing plastic deformation when a smaller force is applied, and freely deforms as in a fluid when a larger force is applied, and examples of the elastoplastic fluid include greases and the like. In view of adhesiveness, thermal conductivity, and the like, the intermediate material is preferably the graphite sheet.

<Heating Step>

The heating step is a step of heating the deep-drawn stainless steel pipe 10 to 900° C. or more. By heating the deep-drawn stainless steel pipe 10 to such a temperature, the deep-drawn stainless steel pipe 10 hardened by the deep-drawing is softened. As a result, an increase in a surface pressure of the deep-drawn stainless steel pipe 10 against the pillar shaped ceramic body 20 can be suppressed during the shrink-fitting step, so that the pillar shaped ceramic body 20 becomes difficult to be broken. Moreover, since the heating step can also perform the heating required for shrink-fitting at the same time, the production time can be shortened and the production cost can be reduced. The heating temperature is preferably less than 1000° C., and more preferably 980° C. or less, in terms of suppressing an increase in the production cost due to an increase in the heating temperature.

Figure 4:
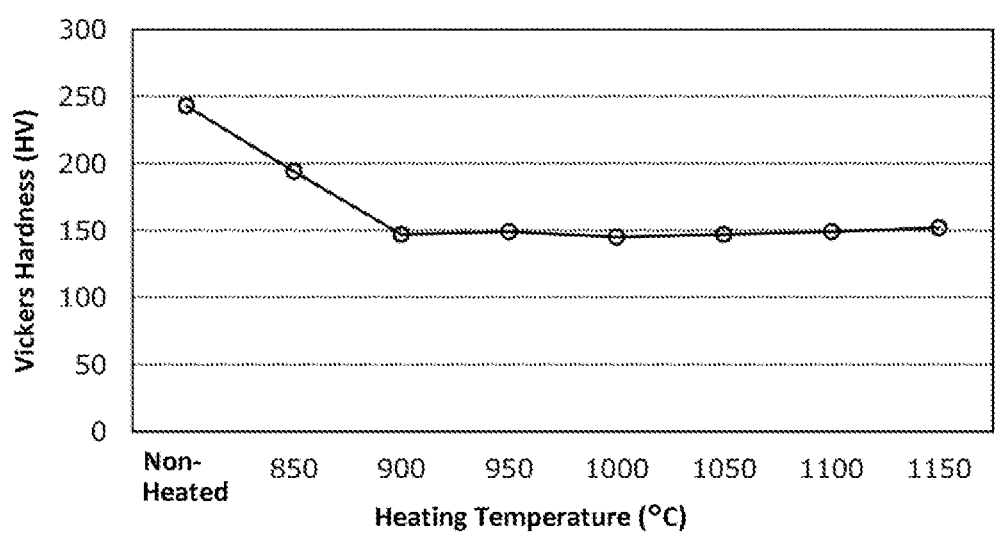
FIG. 4 is a heating temperature dependent graph of a Vickers hardness at a central portion of an axial length of a deep-drawn stainless steel pipe made of SUS436L.

Here, referring to FIG. 4, it shows a heating temperature dependent graph of a Vickers hardness at a central portion of an axial length of the deep-drawn stainless steel pipe 10 (with an axial length of 57 mm, an outer diameter of 87 mm, and inner diameter of 85 mm, and a thickness of 1 mm) made of SUS436L. As shown in FIG. 4, the non-heated deep-drawn stainless steel pipe 10 had a Vickers hardness of 243 HV, while the Vickers hardness of the deep-drawn stainless steel pipe 10 was decreased to about 150 HV by heating at 900° C. or more. Therefore, the heating temperature of 900° C. or more can allow the deep-drawn stainless steel pipe 10 hardened by the deep-drawing to be sufficiently softened.

The above Vickers hardness is an average value of five measured values measured at room temperature (25° C.) using a Vickers hardness tester.

The heating time is not particularly limited, but it may preferably be 5 seconds or more, and more preferably 10 seconds or more. The control to such a heating time can allow the deep-drawn stainless steel pipe 10 to be sufficiently softened. Moreover, the heating time is preferably 60 seconds or less, and more preferably 30 seconds or less, in terms of suppressing an increase in the production cost due to a prolonged heating time.

The heating method is not particularly limited, but a heating means may be arranged on the outer peripheral side of the deep-drawn stainless steel pipe 10, and the deep-drawn stainless steel pipe 10 may be heated by the heating means. As a heating means, for example, a high-frequency heater or the like can be used.

<Shrink-Fitting Step>

The shrink-fitting step is a step of inserting the pillar shaped ceramic body 20 into the heated deep-drawn stainless steel pipe 10 and shrink-fitting them. Specifically, as shown in FIG. 3, the pillar shaped ceramic body 20 is moved in the direction of the arrow, arranged at a predetermined position in the heated deep-drawn stainless steel pipe 10, and shrink-fitted. As the temperature of the heated deep-drawn stainless steel pipe 10 decreases, the deep-drawn stainless steel pipe 10 expanded by heating is contracted, resulting in the shrink-fitted member 30 in which the pillar shaped ceramic body 20 is fixed at the predetermined position in the deep-drawn stainless steel pipe 10.

The method of moving the pillar shaped ceramic body 20 can be carried out using various known driving means, although not particularly limited. For example, the deep-drawn stainless steel pipe 10 and the pillar shaped ceramic body 20 may be positioned so as to be aligned, and the pillar shaped ceramic body 20 may be moved to the predetermined position in the deep-drawn stainless steel pipe 10 by a driving means having a drive shaft.

<Cooling Step>

The cooling step is a step of cooling the deep-drawn stainless steel pipe 10. The active cooling can allow the shrink-fitted member 30 to be rapidly obtained.

The cooling conditions are not particularly limited, and they may be appropriately adjusted according to the type of the deep-drawn stainless steel pipe 10 to be used, and the like.

The method for producing the shrink-fitted member according to the embodiment of the present invention having the steps as described above can soften the deep-drawn stainless steel pipe 10 hardened by the deep-drawing process, thereby suppressing an increase in the surface pressure of the deep-drawn stainless steel pipe 10 relative to the pillar shaped ceramic body 20 during the shrink-fitting step, so that any breakage of the pillar shaped ceramic body 20 can be suppressed.

Further, the shrink-fitted member 30 produced by the production method uses the seamless deep-drawn stainless steel pipe 10, and the breakage of the pillar shaped ceramic body 20 is suppressed, so that it has improved durability and reliability. Therefore, it is suitable for use as a heat exchange member.

EXAMPLES

Hereinafter, the present invention will be described in more detail with reference to Examples, but the present invention is not limited to these Examples.

As the pillar shaped ceramic body, a honeycomb structure having a circular cross section perpendicular to the axial direction (cylindrical shape) was produced. First, a green body containing SiC powder was extruded into a desired shape, dried, processed into a predetermined outer dimension, impregnated with Si and fired to form a honeycomb structure. For the formed honeycomb structure, the cell shape in the cross section perpendicular to the axial direction was set to a rectangle, the cell density was set to 56 cells/cm$^2$, the outer peripheral wall diameter (outer diameter) was set to 85 mm, the length in the axial direction (flow path direction of the first fluid) was set to 36 mm, the thickness of the outer peripheral wall was set to 1.5 mm, the thickness of the partition wall was set to 0.3 mm, the porosity of the outer peripheral wall and the partition wall was set to 2%, the thermal conductivity (25° C.) was set to 150 W/(m·K), and the isostatic strength was set to 100 MPa.

The deep-drawn stainless steel pipe (made of SUS436L; not heat-treated) formed by the deep-drawing was then prepared. The deep-drawn stainless steel pipe had an axial length of 57 mm, an outer diameter of 87 mm, an inner diameter of 85 mm, a thickness of 1 mm, and a thermal expansion coefficient of $11 \times 10^{-6}$/° C. at 0 to 1100° C.

Subsequently, the deep-drawn stainless steel pipe was heated to the temperature as shown in Table 1, and the honeycomb structure was then inserted into the deep-drawn stainless steel pipe and shrink-fitted to obtain a shrink-fitted member.

For the resulting shrink-fitted member, the presence or absence of cracks in the honeycomb structure was evaluated by visually observing the honeycomb structure. Also, the Vickers hardness at the central portion of the axial length of the deep-drawn stainless steel pipe was measured by the method as described above. These results are shown in Table 1.

TABLE 1

| Heating Temperature (° C.) | 850 | 900 | 950 | 1000 | 1050 |
|---|---|---|---|---|---|
| Vickers Hardness (HV) | 194 | 147 | 149 | 145 | 147 |
| Presence or Absence of Cracks | Present | Absent | Absent | Absent | Absent |

As shown in Table 1, when the deep-drawn stainless steel pipe was heated to a temperature of 900° C. or more, the deep-drawn stainless steel pipe could be sufficiently softened, so that no crack was generated in the honeycomb structure after the shrink-fitting. On the other hand, when the deep-drawn stainless steel pipe was heated at 850° C., the deep-drawn stainless steel pipe could not be sufficiently softened, so that cracks were generated in the honeycomb structure after the shrink-fitting.

As can be seen from the above results, according to the present invention, it is possible to provide a method for producing a shrink-fitted member that can suppress breakage of a pillar shaped ceramic body even if a deep-drawn stainless steel pipe produced by deep-drawing is used.

DESCRIPTION OF REFERENCE NUMERALS 10 deep-drawn stainless steel pipe
20 pillar shaped ceramic body
30 shrink-fitted member
100, 200 honeycomb structure
110 outer peripheral wall
120 cell
130 partition wall
140 Inner peripheral wall

The invention claimed is:

1. A method for producing a shrink-fitted member by arranging a pillar shaped ceramic body inside a deep-drawn stainless steel pipe and shrink-fitting them, the method comprising:
   a preparing step of preparing the deep-drawn stainless steel pipe produced by deep-drawing and the pillar shaped ceramic body;
   a heating step of heating the deep-drawn stainless steel pipe to 900° C. or more; and
   a shrink-fitting step of inserting the pillar shaped ceramic body into the heated deep-drawn stainless steel pipe and shrink-fitting them.

2. The method according to claim 1, wherein the deep-drawn stainless steel pipe is heated for 5 seconds or more.

3. The method according to claim 1, wherein the deep-drawn stainless steel pipe is not subjected to a heat treatment after the deep-drawing and before the heating step.

4. The method according to claim 2, wherein the deep-drawn stainless steel pipe is not subjected to a heat treatment after the deep-drawing and before the heating step.

5. The method according to claim 1, further comprising a cooling step of cooling the shrink-fitted member after the shrink-fitting step.

6. The method according to claim 2, further comprising a cooling step of cooling the shrink-fitted member after the shrink-fitting step.

7. The method according to claim 3, further comprising a cooling step of cooling the shrink-fitted member after the shrink-fitting step.

8. The method according to claim 4, further comprising a cooling step of cooling the shrink-fitted member after the shrink-fitting step.

9. The method according to claim 1, wherein the pillar shaped ceramic body is a honeycomb structure comprising: an outer peripheral wall; and a partition wall arranged on an inner side of the outer peripheral wall, the partition wall defining a plurality of cells each extending from a first end face to a second end face, or a honeycomb structure comprising: an outer peripheral wall; an inner peripheral wall; and a partition wall arranged between the outer peripheral wall and the inner peripheral wall, the partition wall defining a plurality of cells each extending from a first end face to a second end face.

10. The method according to claim 2, wherein the pillar shaped ceramic body is a honeycomb structure comprising: an outer peripheral wall; and a partition wall arranged on an inner side of the outer peripheral wall, the partition wall defining a plurality of cells each extending from a first end face to a second end face, or a honeycomb structure comprising: an outer peripheral wall; an inner peripheral wall; and a partition wall arranged between the outer peripheral wall and the inner peripheral wall, the partition wall defining a plurality of cells each extending from a first end face to a second end face.

11. The method according to claim 3, wherein the pillar shaped ceramic body is a honeycomb structure comprising: an outer peripheral wall; and a partition wall arranged on an inner side of the outer peripheral wall, the partition wall defining a plurality of cells each extending from a first end face to a second end face, or a honeycomb structure comprising: an outer peripheral wall; an inner peripheral wall; and a partition wall arranged between the outer peripheral wall and the inner peripheral wall, the partition wall defining a plurality of cells each extending from a first end face to a second end face.

12. The method according to claim 4, wherein the pillar shaped ceramic body is a honeycomb structure comprising: an outer peripheral wall; and a partition wall arranged on an inner side of the outer peripheral wall, the partition wall defining a plurality of cells each extending from a first end face to a second end face, or a honeycomb structure comprising: an outer peripheral wall; an inner peripheral wall; and a partition wall arranged between the outer peripheral wall and the inner peripheral wall, the partition wall defining a plurality of cells each extending from a first end face to a second end face.

13. The method according to claim 5, wherein the pillar shaped ceramic body is a honeycomb structure comprising: an outer peripheral wall; and a partition wall arranged on an inner side of the outer peripheral wall, the partition wall defining a plurality of cells each extending from a first end face to a second end face, or a honeycomb structure comprising: an outer peripheral wall; an inner peripheral wall; and a partition wall arranged between the outer peripheral wall and the inner peripheral wall, the partition wall defining a plurality of cells each extending from a first end face to a second end face.

14. The method according to claim 1, wherein the deep-drawn stainless steel pipe has a thermal expansion coefficient of 10 to $22 \times 10^{-6}/°$ C. at 0 to 1100° C.

15. The method according to claim 2, wherein the deep-drawn stainless steel pipe has a thermal expansion coefficient of 10 to $22 \times 10^{-6}/°$ C. at 0 to 1100° C.

16. The method according to claim 3, wherein the deep-drawn stainless steel pipe has a thermal expansion coefficient of 10 to $22 \times 10^{-6}/°$ C. at 0 to 1100° C.

17. The method according to claim 4, wherein the deep-drawn stainless steel pipe has a thermal expansion coefficient of 10 to $22 \times 10^{-6}/°$ C. at 0 to 1100° C.

18. The method according to claim 5, wherein the deep-drawn stainless steel pipe has a thermal expansion coefficient of 10 to $22 \times 10^{-6}/°$ C. at 0 to 1100° C.

19. The method according to claim 9, wherein the deep-drawn stainless steel pipe has a thermal expansion coefficient of 10 to $22 \times 10^{-6}/°$ C. at 0 to 1100° C.

* * * * *